(12) United States Patent
Wakitani et al.

(10) Patent No.: US 7,847,434 B2
(45) Date of Patent: Dec. 7, 2010

(54) COGENERATION SYSTEM

(75) Inventors: Tsutomu Wakitani, Saitama (JP);
Hiroyuki Eguchi, Saitama (JP);
Yoshinori Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 12/069,746

(22) Filed: Feb. 13, 2008

(65) Prior Publication Data

US 2008/0197630 A1    Aug. 21, 2008

(30) Foreign Application Priority Data

Feb. 19, 2007    (JP)    ............... 2007-038225
Feb. 19, 2007    (JP)    ............... 2007-038228

(51) Int. Cl.
*H02J 7/00* (2006.01)

(52) U.S. Cl. ...................................................... 307/65

(58) Field of Classification Search .................... 307/64, 307/65, 43
See application file for complete search history.

(56) References Cited

U.S. PATENT DOCUMENTS 3,991,319 A * 11/1976 Servos et al. .................. 307/64

| | | | |
|---|---|---|---|
| 6,753,622 B2 * | 6/2004 | Oughton, Jr. ................. | 307/64 |
| 7,432,615 B2 * | 10/2008 | Hjort ........................... | 307/64 |
| 2004/0051387 A1 | 3/2004 | Lasseter et al. | |
| 2006/0202559 A1 * | 9/2006 | Hashimoto et al. ............ | 307/64 |

FOREIGN PATENT DOCUMENTS

JP          05-328615         12/1993

* cited by examiner

*Primary Examiner*—Jared J Fureman
*Assistant Examiner*—Michael Rutland Wallis
(74) *Attorney, Agent, or Firm*—Carrier Blackman & Associates, P. C.; Joseph P. Carrier; William D. Blackman

(57) ABSTRACT

A cogeneration system comprising a generator connected to an AC power feed line between a power network and an electrical load and an internal combustion engine for driving the generator and for supplying its exhaust heat to a thermal load. The power supply from the generator to the power network is interrupted by turning off a switch installed in the feed line when an outage of the power network is detected. A battery for storing DC power is connected to an inverter circuit to invert the DC power to AC power, such that the inverted AC power of the battery and the output of the generator are supplied to the electrical load, thereby enabling the system to respond to a power network outage and preventing reverse flow of the power output by the cogeneration system into the power network while supplying as much electric power as possible to the electrical load.

13 Claims, 10 Drawing Sheets

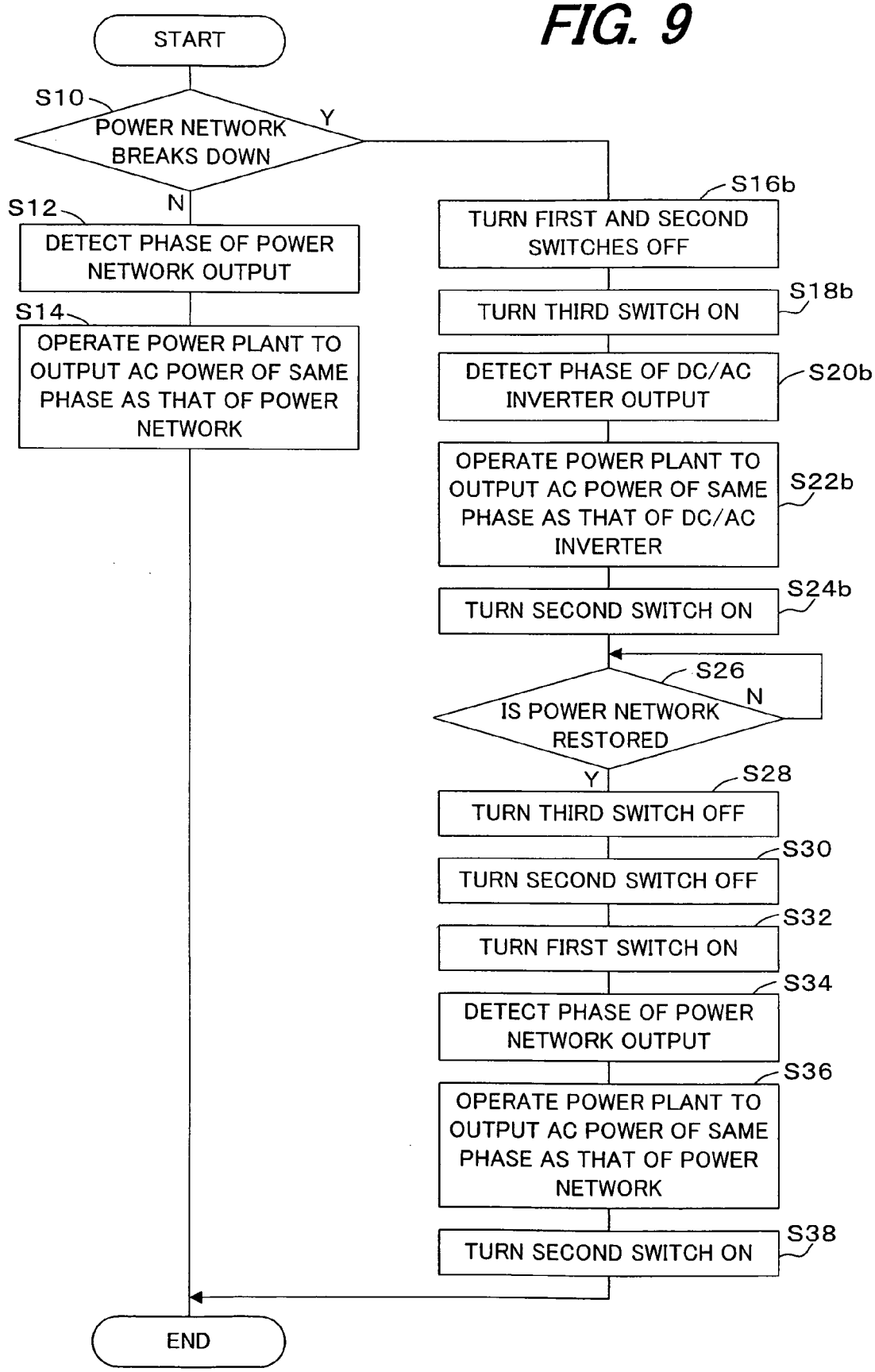

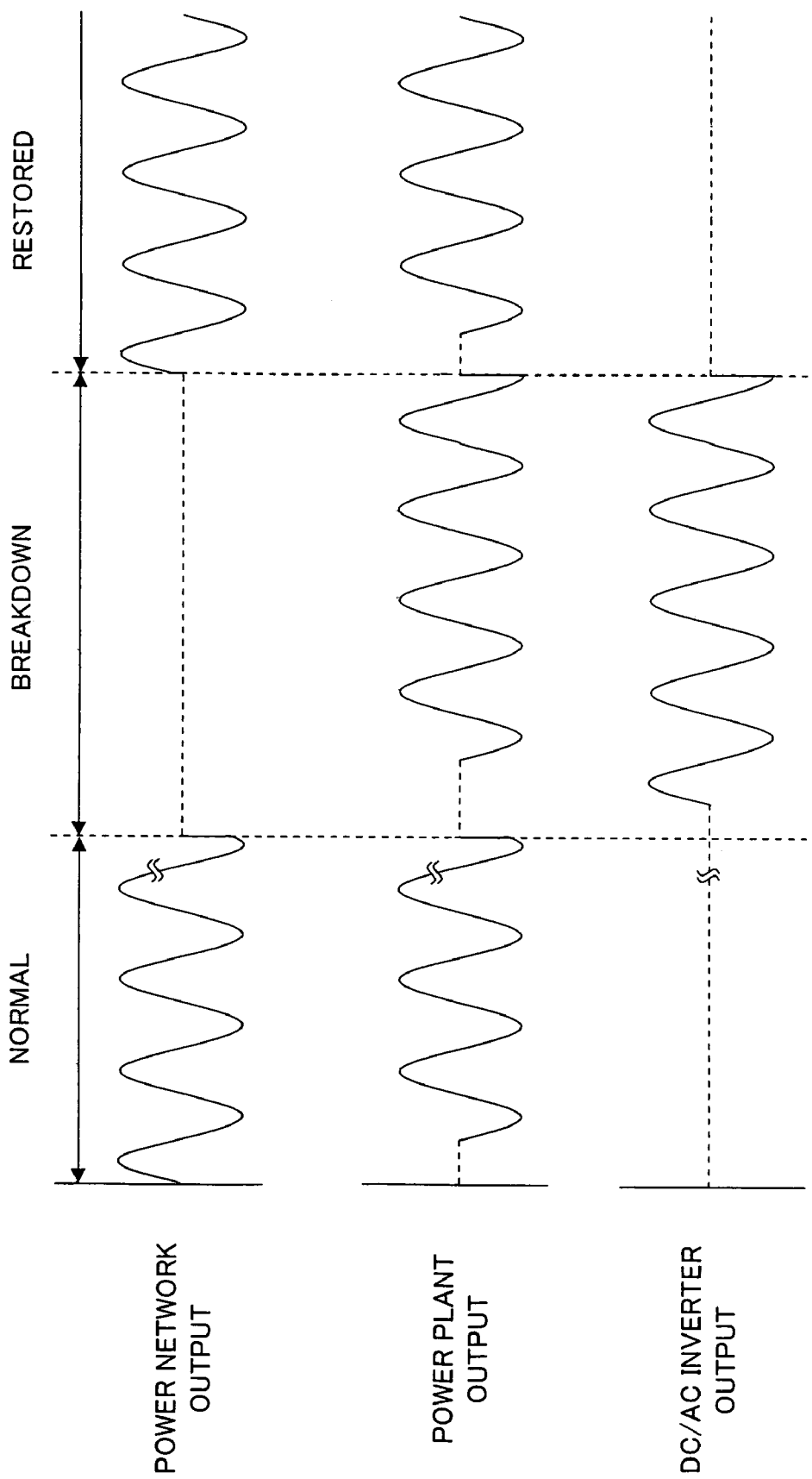

COGENERATION SYSTEM

CROSS REFERENCE TO RELATED APPLICATIONS

The present application claims priority under 35 USC 119 based on Japanese Patent Applications JP2007-038225 and JP2007-038228 filed on Feb. 19, 2007, the entire contents of these priority documents are incorporated herein by reference.

BACKGROUND OF THE INVENTION

1. Field of the Invention

This invention relates to a cogeneration system, particularly to a cogeneration system responsive to a commercial power network outage for supplying a load with as much electric power as possible.

2. Description of the Related Art

In recent years, cogeneration systems have been developed that are equipped with an internal combustion engine-driven generator for installation in an AC power supply line between a commercial power network and an electrical load for supplying power to the load in interconnection with the power network and also for supplying hot water or air or the like heated using exhaust heat from the engine to a thermal load. Such a cogeneration system is taught, for example, by Japanese Laid-Open Patent Application No. Hei 5 (1993)-328615.

In the cogeneration system taught in the reference, an engine-operated, on-site power generation plant is connected to an on-site load and three other loads are connected to be switchable between a commercial power utility (commercial power network) and the engine-operated, on-site power generation plant. When the operating load of the on-site load exceeds a predetermined value, the other three loads are connected to the commercial power utility side and as the amount of operating load decreases below the predetermined value, the other three loads are sequentially connected to the engine-operated, on-site power generation plant.

When the power network interconnected with this type of cogeneration system experiences an outage, the ordinary practice is to shut down the cogeneration system to prevent a reverse flow of its power output into the power network. Alternatively, it is conceivable to not shut down the cogeneration system at the time of a power failure but to keep it operating for supplying power to the electrical load. In this case, however, the maximum amount of power that can be supplied is limited to the inherent maximum output of the cogeneration system.

SUMMARY OF THE INVENTION

An object of this invention is therefore to overcome the foregoing disadvantage by providing a cogeneration system that is responsive to a commercial power network outage for preventing reverse flow of the power output by the cogeneration system into the power network and supplying as much electric power as possible to the electrical load.

In order to achieve the object, this invention provides a cogeneration system having a power plant that includes a generator connected to an AC power feed line between a power network and an electrical load and an internal combustion engine for driving the generator such that exhaust heat of the engine is supplied to a thermal load, comprising: a battery for storing DC power; an inverter circuit that inverts DC power to AC power; a switch installed in the feed line; a power supply interrupter that interrupts power supply from the generator to the power network by turning off the switch, when an outage of the power network is detected; and a battery connector that connects the battery to the inverter circuit, such that inverted AC power of the battery and the output of the generator are supplied to the electrical load when the power supply from the generator to the power network is interrupted.

BRIEF DESCRIPTION OF THE DRAWINGS

The above and other objects and advantages of the invention will be more apparent from the following description and drawings in which:

FIG. 9 is a flowchart, similar to part of the flowchart of FIG. 2, but showing a portion of the operation of the cogeneration system according to the fourth embodiment; and FIG. 10 is a time chart, similar to FIG. 3, but explaining a synchronous operation of the power plant in the fourth embodiment.

DETAILED DESCRIPTION OF THE PREFERRED EMBODIMENTS

Cogeneration systems according to embodiments of the invention will now be explained with reference to the attached drawings.

Figure 1:
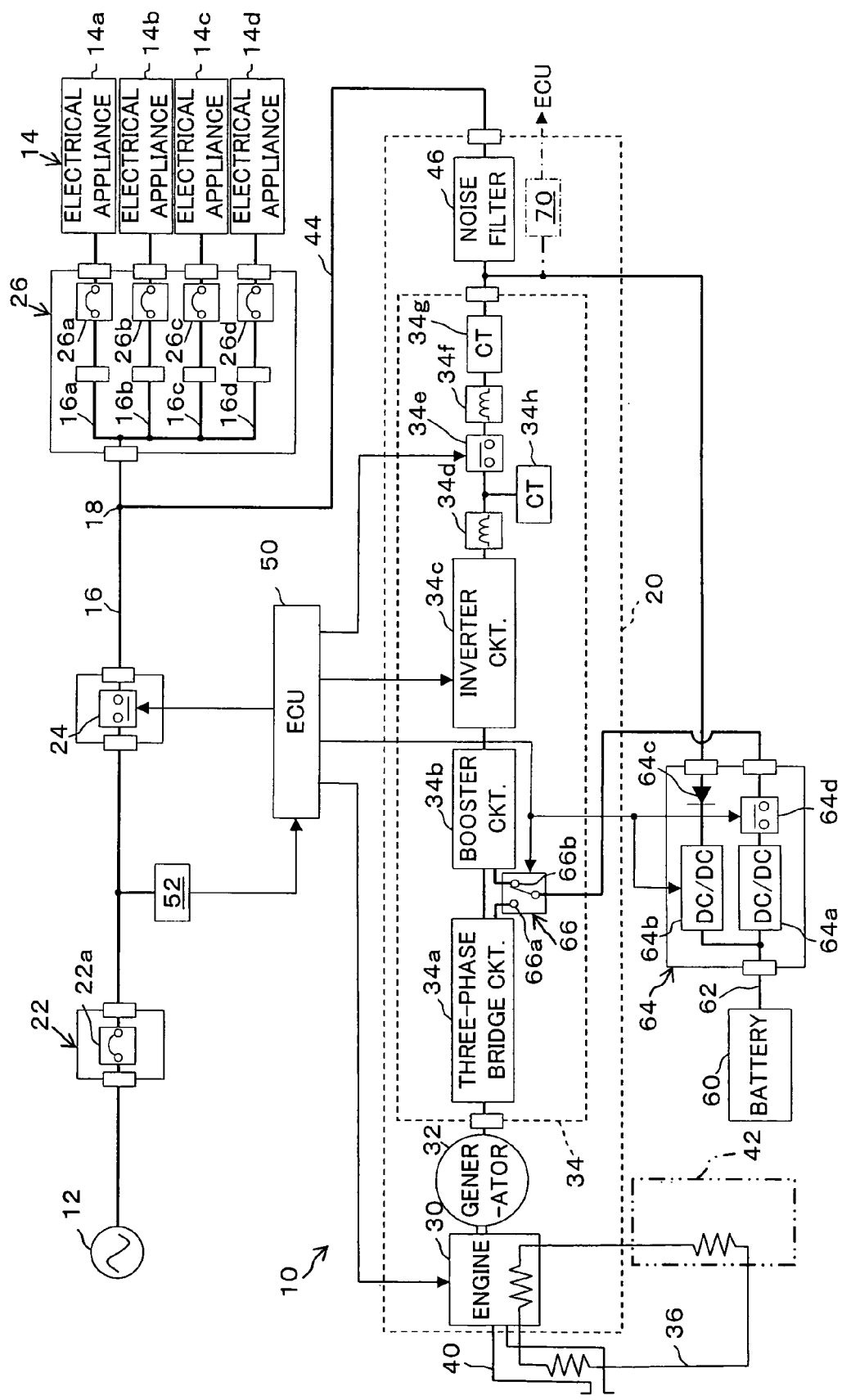
FIG. 1 is a block diagram giving an overall view of a cogeneration system according to a first embodiment of this invention.

FIG. 1 is a block diagram giving an overall view of a cogeneration system according to a first embodiment of this invention.

As illustrated, the cogeneration system (designated by reference numeral 10) is equipped with a power plant 20 connected through a connection 18 to an AC power feed line (power line; first feed line) 16 between a commercial power network (network power) 12 and an electrical load 14. The power network 12 outputs single-phase, three-wire, 100/200 V, 50 Hz (or 60 Hz) AC power.

The power plant 20, which will be explained further below, has a relatively small output and is suitable for use at homes and the like. The electrical load 14 comprises a plurality of, specifically four electrical AC appliances 14a, 14b, 14c, 14d. Typically, 14a might be a lighting fixture, 14b a washing machine, 14c a refrigerator, and 14d an air-conditioner.

The first feed line 16 is installed with, in order from the power network 12 side (upstream side), a main breaker box 22, a first switch 24 and a circuit breaker panel 26. It is connected to the electrical load 14 downstream of the panel 26. A main breaker 22a for overcurrent protection is installed in the main breaker box 22.

The first switch 24 is installed in the first feed line 16 at a location upstream (on the power network 12 side) of the connection 18 with the power plant 20. When the first switch 24 is turned ON, the power network 12 is connected with the electrical load 14 and the power plant 20. When it is turned OFF, the connection with the electrical load 14 and power plant 20 is broken, thereby preventing supply (reverse flow) of power from the power plant 20 to the power network 12. Under ordinary circumstances (when there has been no outage of the power network 12), the first switch 24 is kept ON.

The first feed line 16 divides into four branch lines 16a, 16b, 16c, 16d at the circuit breaker panel 26, and the four branches connect with the electrical appliances (load) 14a, 14b, 14c, 14d through associated breakers 26a, 26b, 26c, 26d. Like the aforesaid main breaker 22a, the breakers 26a to 26d open when the current exceeds predetermined values, thereby preventing the overcurrent from reaching the electrical load 14. As illustrated in FIG. 1, electrical connection with the main breaker box 22, first switch 24, circuit breaker panel 26 and the like is established through terminals (indicated by small boxes), which will not be described in detail.

The power plant 20 comprises or includes an internal combustion engine 30, generator 32 driven by the engine 30, and inverter 34 connected to the generator 32.

The units making up the power plant 20 will now be explained.

The engine 30 is a single-cylinder, four-cycle, water-cooled, spark-ignition, OHV engine that runs on gasoline and has a displacement of, for example, 163 cc. The coolant passage (not shown) of the engine 30 is connected to piping 36 that passes through the interior of a muffler 40 of the engine 30 and then into a hot water storage tank (thermal load) 42. The coolant of the engine 30 flows through the piping 36.

The coolant heated by operation of the engine 30 is further heated while passing through the muffler 40 and is then sent to the storage tank 42 where it raises the temperature of the water stored in the tank by heat exchange. The coolant cooled by the heat exchange is returned through the upstream segment of the coolant passage to cool the engine 30. By this process, the exhaust heat of the engine 30 can be used, for example, to make hot water. The hot water stored in the storage tank 42 is supplied to a thermal load such as a hot-water supply system (not shown) for a kitchen and/or bath.

The generator 32 comprises a three-phase AC generator that produces an AC power output when its rotor (not shown) is driven by the engine 30 controlled to operate at a predetermined engine speed. The generator 32 is designed to have a maximum power output of, say, 1.0 kW.

The generator 32 also functions as a starter for the engine 30. The starting operation is conducted by supplying current to the stator coil (not shown) of the generator 32 so as to rotate its rotor, which is connected to the engine 30, and thereby cranking and starting the engine 30. The generator 32 is thus a starter-generator that functions both as a starter for the engine 30 and as a generator (alternator) that outputs AC power.

The inverter 34 is equipped with a three-phase bridge circuit (drive circuit) 34a that converts the AC output of the generator 32 to a DC output, a booster circuit 34b that boosts or steps up the voltage of the DC power rectified by the three-phase bridge circuit 34a to a predetermined voltage, and an inverter circuit 34c that inverts the boosted DC power to AC, i.e., inverts it to single-phase, three-wire, 100/200 V AC power of the same frequency as that of the power supplied by the power network 12. The inverter circuit 34c is equipped with multiple switching elements constituted of insulated-gate bipolar transistors (Insulated-Gate Bipolar Transistors) whose switching action inverts DC to AC.

The inverter 34 is further equipped with a choke coil 34d that removes noise from the inverter circuit output, a second switch 34e, a common-mode coil 34f that removes noise from the second switch output, and a current sensor (current transformer (CT)) 34g that detects the current, i.e., the amperage of the common-mode coil output.

When the second switch 34e is turned ON, the inverter circuit output is supplied to the electrical load 14, and when it is turned OFF, supply of the output to the load 14 is cut off. A second current sensor 34h is connected between the choke coil 34d and the second switch 34e and produces an output indicating the amperage of the AC current at that point.

The inverter 34 is connected to the first feed line 16 through a second feed line 44 and the connection 18. The AC power outputted by the inverter 34 is therefore supplied to the electrical appliances (load) 14a, 14b, 14c, 14d through the second feed line 44, connection 18, first feed line 16 and circuit breaker panel 26 (breakers 26a to 26d). A noise filter 46 is interposed between the inverter 34 and the second feed line 44 for removing noise from the output of the inverter 34.

The cogeneration system 10 is further equipped with a microcomputer-based Electronic Control Unit (hereinafter referred to as "ECU") 50 and a current-voltage sensor 52 connected to the first feed line 16. The current-voltage sensor 52 produces and sends to the ECU 50 outputs or signals representing the voltage, current and phase (sine wave) of the AC power on the first feed line 16.

Based on the outputs from the current-voltage sensor 52, the ECU 50 discriminates or determines whether or not the power network 12 supplies AC power through the first feed line 16, i.e., whether it operates normally or has experienced a power outage, and detects the phase and the like of the AC power when it discriminates that the power network 12 supplies AC power. Based on the so-determined detection values and the like, the ECU 50 controls the operation of the first switch 24, engine 30, inverter circuit 34c, second switch 34e and other system elements. This control will be explained below.

In addition to the power plant 20, the cogeneration system 10 has a battery 60 that stores DC power, and a DC/DC converter unit 64 that is connected to the battery 60 through a power line 62 and steps up the voltage from the battery 60.

The battery 60 is made up of a suitable number of nickel-metal hydride (Ni-MH) voltaic cells that are connected in series and store, for example, 12V DC power. The DC/DC converter unit 64 is equipped with first and second DC/DC converters 64a, 64b that utilize the switching action of IGBTs (not shown) to step up/down the voltage of inputted power to a predetermined value, a diode 64c whose anode terminal is connected to the output side of the inverter 34 and whose cathode terminal is connected to the second DC/DC converter 64b, and a third switch 64d.

The output of the battery 60 is stepped up to the predetermined voltage by the first DC/DC converter 64a and forwarded to the third switch 64d. When the third switch 64d is turned ON, the output of the battery 60 stepped up by the first DC/DC converter 64a is supplied to a selector switch 66 (explained below), and when it is turned OFF, the supply of the battery output is cut off.

The selector switch 66 is configured to be switched between a first terminal 66a connected to the three-phase bridge circuit 34a and a second terminal 66b connected to the booster circuit 34b.

Therefore, in the case where the third switch 64d of the DC/DC converter unit 64 is turned ON, the battery 60 is connected to the three-phase bridge circuit 34a of the inverter 34 when the selector switch 66 is switched to the first terminal 66a and is connected to the booster circuit 34b (i.e., the inverter circuit 34c of the inverter 34) when the selector switch 66 is switched to the second terminal 66b.

In the case where the third switch 64d is turned OFF, connection between the battery 60 and the inverter 34 is cut off irrespective of the operation (toggling) of the selector switch 66. Normally (when no power outage has occurred), the third switch 64d is turned OFF and the selector switch 66 is switched to select the second terminal 66b.

Under a predetermined operating state, the AC power output by the inverter 34 is converted to DC by the diode 64c and sent to the second DC/DC converter 64b to be suitably lowered in voltage and then supplied to the battery 60 as charging current.

Figure 2:
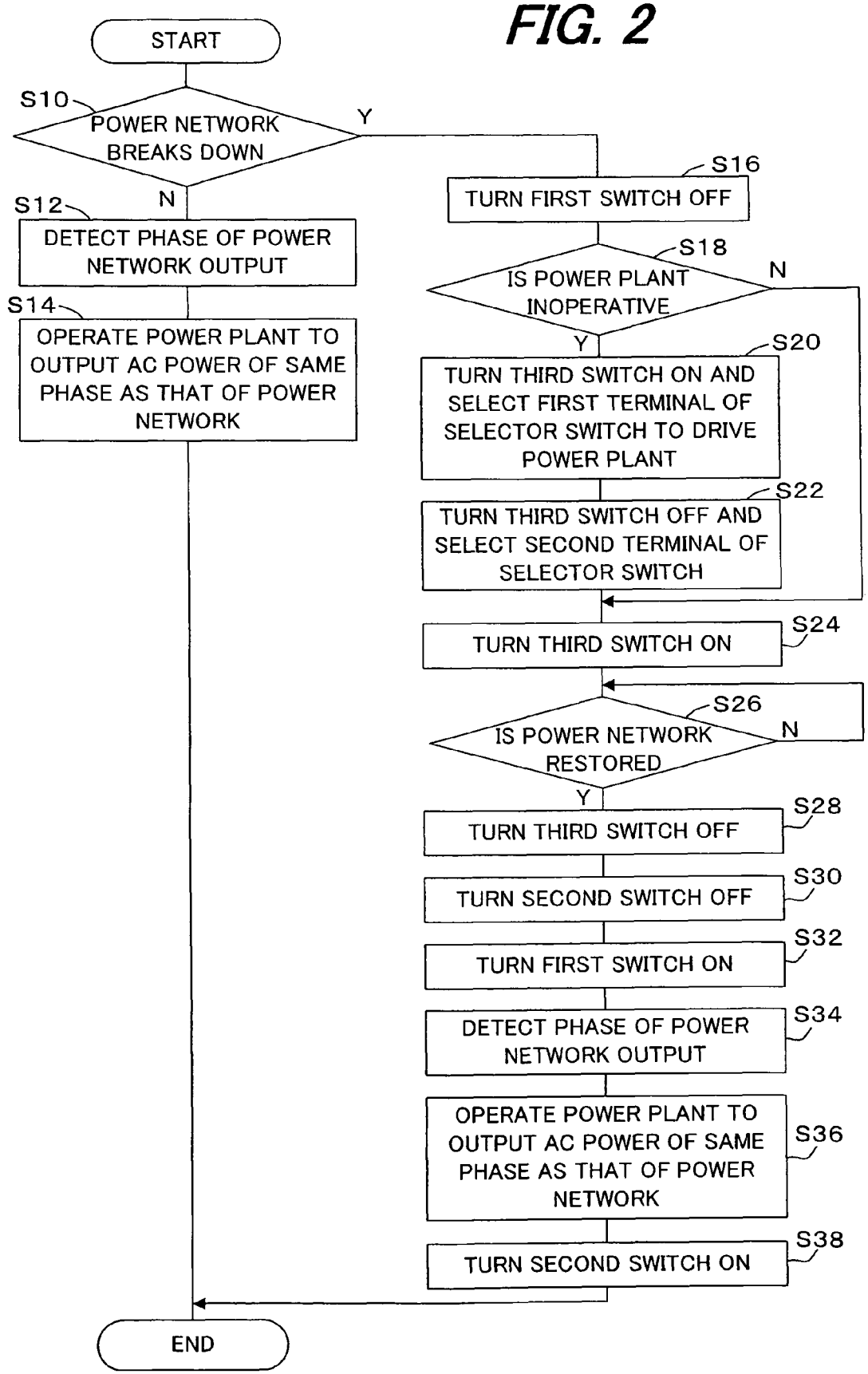
FIG. 2 is a flowchart showing the operation of the cogeneration system illustrated in FIG. 1.

FIG. 2 is a flowchart showing the operation of the cogeneration system 10, more specifically the sequence of operations of the ECU 50.

First, in S10, it is determined whether the power network 12 breaks down (a power outage has occurred). This determination is made based on the output of the current-voltage sensor 52. Specifically, the power network 12 is determined to be normal when the current-voltage sensor 52 produces a predetermined output indicating supply of AC power, and the power network 12 is determined to break down when the output is not produced.

When the result in S10 is NO, i.e., when the power network 12 is determined to be normal, the program proceeds to S12, in which the phase of the power network 12 output (AC power) is detected from the output of the current-voltage sensor 52.

The program proceeds next to S14, in which the engine 30 is started and the power plant 20 is operated to output AC power of the same phase as that of the power network 12, i.e., the power plant 20 is operated in synchronism with the power network 12, when a predetermined operating condition has been established.

Figure 3:
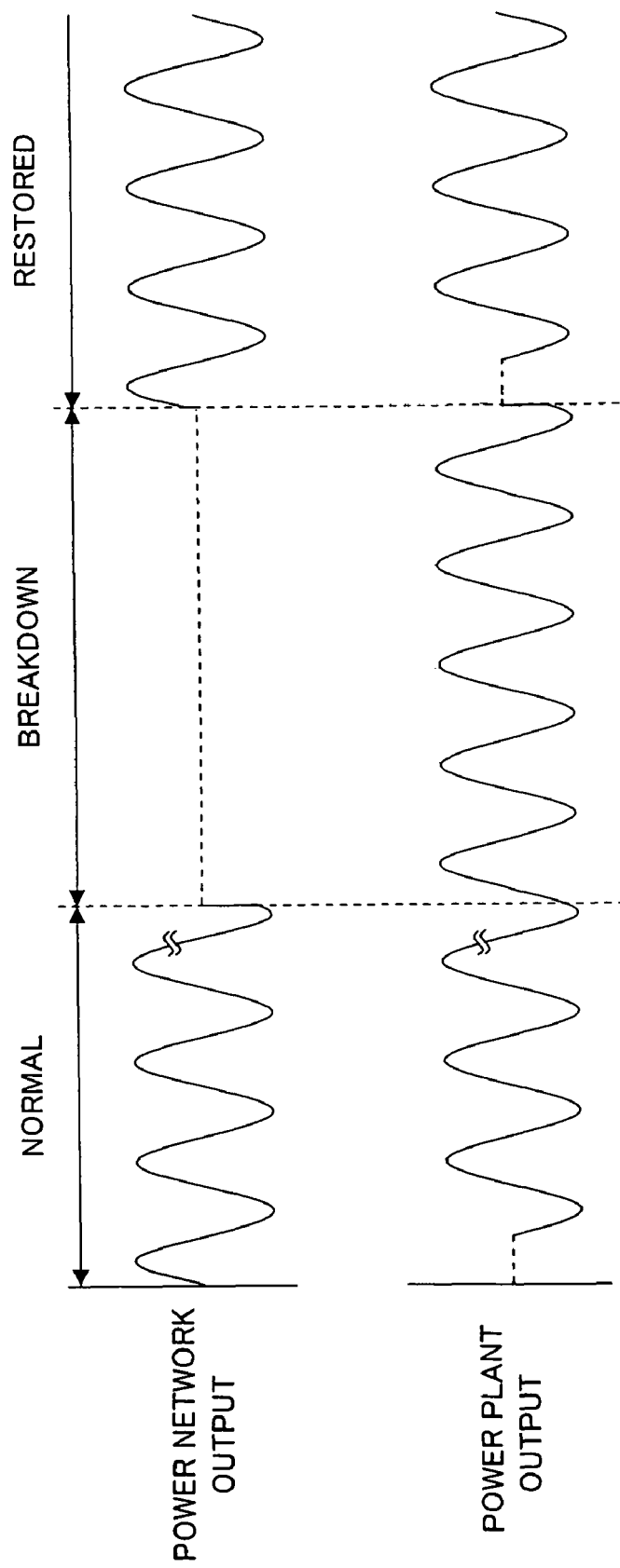
FIG. 3 is a time chart explaining a synchronous operation of a power plant referred to in the flowchart of FIG. 2.

FIG. 3 is a time chart explaining the synchronous operation of the power plant 20.

As shown in the time chart, when the power network 12 is normal, the power plant 20 is operated to output AC power of the same phase as that of the output of the power network 12. Specifically, the ECU 50 supplies a signal representing the detected AC power output of the power network 12 to the inverter circuit 34c via a signal line. In response, the inverter circuit 34c outputs AC power of a same phase with that indicated by the received signal.

The starting of the engine 30 when the power network 12 is normal is performed by operating the generator 32 using power supplied from the power network 12. Specifically, network 12 power is supplied to the stator coil of the generator 32 through a feed line (power line; not shown) so as to rotate the rotor of the generator 32 and thus crank and start the engine 30.

The inverter circuit 34c supplies the electrical load 14 with AC power coinciding with the AC power of the power network 12 at least in phase, through the second feed line 44, connection 18 and first feed line 16. During normal operation (no power outage), the second switch 34e is kept ON.

Thus when the power network 12 is normal and the predetermined operating condition has been established, the power plant 20 is driven to synchronously output AC power of the same phase as the detected phase of the AC power from the power network 12, such that the cogeneration system 10 is interconnected with or in cooperation with the power network 12. As a result, the electrical load 14 is supplied both with power from the power network 12 and with power from the power plant 20. The electrical load 14 is operated with power from the power plant 20 when this power is sufficient. When it is insufficient, the electrical load 14 is also supplied with supplementary power from the power network 12.

The explanation of the flowchart of FIG. 2 will be continued. When the result in S10 is YES, i.e., when a power network 12 outage is determined to have occurred, the program proceeds to S16, in which the first switch 24 is turned OFF. That is, the first switch 24 is turned OFF to cut off or interrupt power supply from the power plant 20 to the power network 12, thereby preventing reverse power flow.

Next, in S18, it is determined whether the power plant 20 is inoperative. This determination is made based on the output of, inter alia, the second current sensor 34h. The result in S14 is ordinarily NO, because the power plant 20 is already being driven, but it is conceivable that the power plant 20 might not be in operation for some reason. So when the result in S18 is YES, the program proceeds to S20 and S22, in which the power plant 20 is operated (started) so that it can be used as an emergency power supply during a power outage.

To be more specific, in S20, the third switch 64d of the DC/DC converter unit 64 is turned ON and the selector switch 66 is switched to select the first terminal 66a. This causes the output of the DC/DC converter unit 64 (the output of the battery 60 stepped up in voltage by the first DC/DC converter 64a) to be supplied to the stator coil of the generator 32 through the selector switch 66 and the three-phase bridge circuit 34a, thereby rotating the rotor of the generator 32. As a result, the engine 30 is cranked and started so as to start (drive) the power plant 20. Thus, the battery 60 is used as an operating power source for starting the engine 30 when the power network 12 fails.

When the power plant 20 starts, the program proceeds to S22, in which the third switch 64d of the DC/DC converter unit 64 is turned OFF and the selector switch 66 is switched to select the second terminal 66b. This cuts off the supply of power from the battery 60 to the generator 32. When the result in S18 is NO, S20 and S22 are skipped.

Next, in S24, the third switch 64d of the DC/DC converter unit 64 is turned ON. Since the selector switch 66 is switched to select the second terminal 66b, the execution of S24 causes the output of the DC/DC converter unit 64 (output of the battery 60) to be supplied to the inverter circuit 34c through the selector switch 66 and the booster circuit 34b. Thus, the battery 60 is connected to the inverter circuit 34c of the generator 32 during a power outage.

The DC power supplied to the booster circuit 34b, i.e., the output power of the DC/DC converter unit 64, will now be explained.

The output voltage of the DC/DC converter unit 64 is set to be lower than that of the output voltage of the generator 32 (more exactly, the output voltage of the three-phase bridge circuit 34a) by a predetermined value. When the output voltage of three-phase bridge circuit 34a is about DC 280 V, for example, the voltage of the power from the DC/DC converter unit 64 is set to be about DC 270V. This will be explained with reference to FIG. 4.

Figure 4:
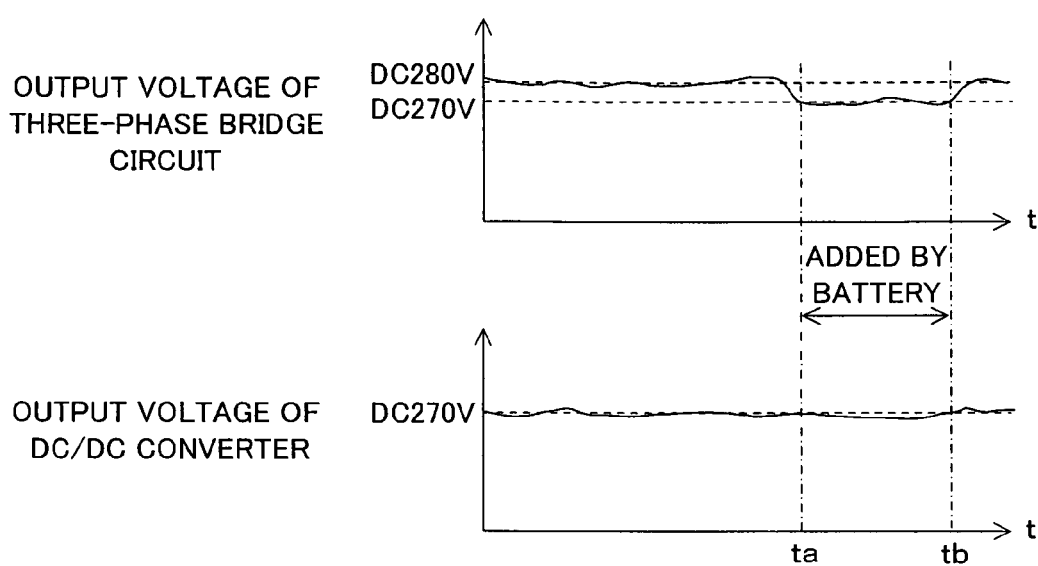
FIG. 4 is a time chart showing an output voltages of a generator and a DC/DC converter unit illustrated in FIG. 1.

FIG. 4 is a time chart showing the output voltages of the generator 32 (more exactly, the three-phase bridge circuit 34a) and the DC/DC converter unit 64.

When the operating load of the electrical load 14 during a power outage is equal to or less than the rated output of the generator 32 (1.0 kW), the generator 32 is operated to make the output voltage of the three-phase bridge circuit 34a DC 280 V (the rated voltage). Since there is a voltage difference of about 10 V between the output voltage of the three-phase bridge circuit 34a and the output voltage of the DC/DC converter unit 64 at this time, the output of the DC/DC converter unit 64 is not supplied to the inverter 34.

Then when the electrical load 14 increases to exceed 1.0 kW, so that an overload occurs, the output voltage of the generator 32, i.e., the output voltage of the three-phase bridge circuit 34a, gradually decreases as shown in FIG. 4. When the output voltage of the three-phase bridge circuit 34a thereafter falls to reach the aforesaid preset output voltage of the DC/DC converter unit 64 (DC 270 V) at time point ta (when it becomes the same as the output voltage of the DC/DC converter unit 64), the output of the DC/DC converter unit 64 comes to be supplied to the booster circuit 34b because the voltage difference between the output of the three-phase bridge circuit 34a and the output of the DC/DC converter unit 64 no longer exists. As a result, the booster circuit 34b of the inverter 34 is supplied with power from the three-phase bridge circuit 34a and the DC/DC converter unit 64, i.e., with power from both the generator 32 and the battery 60.

After the DC power supplied to the booster circuit 34b in this manner has been boosted in voltage, it is inverted to AC power by the inverter circuit 34c and supplied to the electrical load 14. The electrical load 14 is therefore supplied with both power from the power plant 20 and power from the battery 60, i.e., with an amount of power obtained by adding power from the battery 60 to the power from the power plant 20. Thus the output of the power plant 20 is supplemented with power from the battery 60 when the output voltage of the three-phase bridge circuit 34a is at or below the output voltage of the DC/DC converter unit 64 (during overload operation).

When the overload condition has been eliminated by supply of supplemental battery power, the once-lowered output voltage of the three-phase bridge circuit 34a gradually rises toward the rated voltage (DC 280 V). Therefore, when the output voltage of the three-phase bridge circuit 34a comes to exceed the output voltage of the DC/DC converter unit 64 (DC 270 V) and again establish a voltage difference at time point tb, the supply of the output of the DC/DC converter unit 64 to the inverter 34 stops.

The supply of the output of the battery 60 to the inverter 34 is thus limited to times when the output voltage of the three-phase bridge circuit 34a falls to or below the output voltage of the DC/DC converter unit 64. When the remaining charge of the battery 60 becomes low owing to, for example, supply of power to the inverter 34, it is charged with power output from the inverter 34.

The explanation of the flowchart of FIG. 2 will be continued. Next, in S26, it is determined whether the power network 12 is restored or back on (the power outage has ended). This determination is also made based on the output of the current-voltage sensor 52.

When the result in S26 is NO, the aforesaid determination is repeated. When it is YES, the program proceeds to S28, in which the third switch 64d of the DC/DC converter unit 64 is turned OFF. This cuts off the supply of power from the battery 60 to the inverter 34, i.e., terminates the power supplementation by the battery 60.

Next, the program proceeds to S30, in which the second switch 34e is turned OFF to once cut off the power supplied to the electrical load 14 from the power plant 20, and to S32, in which the first switch 24 is turned ON to supply AC power from the power network 12 to the electrical load 14.

The program then proceeds to S34, in which the phase of the output (AC power) of the power network 12 is detected. Next, in S36, similar to S14, the engine 30 is started and the power plant 20 is operated to output AC power of the same phase as that of the power network 12 when a predetermined operating condition has been established, as shown in FIG. 3. The program then proceeds to S38, in which the second switch 34e is turned ON. As a result, the electrical load 14 is supplied with both power from the power network 12 and power from the power plant 20.

The cogeneration system 10 according to the first embodiment is thus equipped with the generator 32 connected to the first AC power feed line 16 between the power network 12 and the electrical load 14 and with the first switch 24 installed in the first feed line 16 and is configured to respond to detection of an outage of the power network 12 by turning OFF the first switch 24 to cut off or interrupt power supply from the generator 32 to the power network 12. Owing to this configuration, reverse flow of the power from the cogeneration system 10 into the power network 12 during an outage of the power network 12 can be reliably prevented.

Moreover, the cogeneration system 10 comprises the battery 60 for storing DC power and is configured so that after it cuts off or interrupts the supply of power from the generator 32 to the power network 12, it connects the battery 60 with the inverter circuit 34c of the generator 32 (more exactly, with the booster circuit 34b installed on the input side of the inverter circuit 34c) so as to invert the output of the generator 32 and the output of the battery 60 into AC power for supply to the electrical load 14.

Owing to this configuration, the power to be supplied to the electrical load 14 can be increased by the amount of the power output from the battery 60. Therefore, even when the electrical load comes to exceed the inherent maximum output of the cogeneration system 10, the electrical load 14 can still be supplied with the required power so long as amount of load in excess is within the power output range of the battery 60.

In addition, when the load does not exceed the inherent maximum output of the cogeneration system 10, power can be stably supplied to the electrical load 14 even in a case where a momentary or instantaneous overload arises owing to inrush current.

Further, the cogeneration system 10 is configured to connect the battery 60 to the starter unit (generator 32) of the engine 30 when the generator 32 is put in operation at the time of a power outage. The engine 30 can therefore be reliably started by the battery 60. And if the cogeneration system should be one already equipped with a battery for starting the engine, the power to be supplied to the electrical load 14 can be increased simply by connecting the existing battery to the inverter circuit 34c at the time of a power outage. In other words, the power to be supplied to the electrical load 14 can be increased without installing another battery.

A cogeneration system 10 according to a second embodiment of this invention will now be explained.

The second embodiment will be explained with focus on points of difference from the first embodiment in the following. In the second embodiment, as indicated by phantom lines in FIG. 1, a voltage sensor 70 is connected to the power line connected to the second feed line 44. The voltage sensor 70 produces to the ECU 50 an output or signal representing the voltage of the second feed line 44, i.e., the output voltage of the inverter circuit 34*c*.

Figure 5:
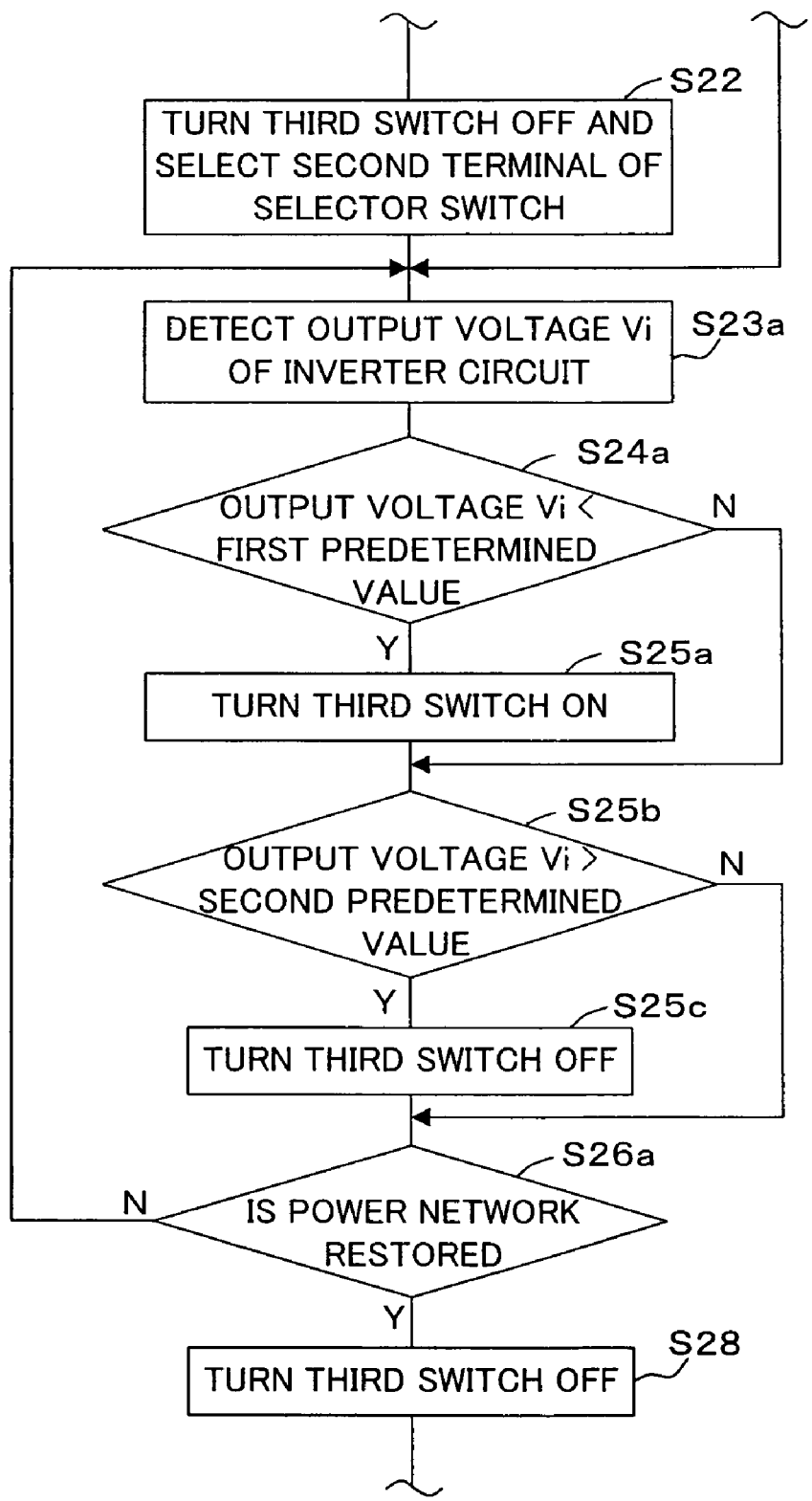
FIG. 5 is a flowchart, similar to part of the flowchart of FIG. 2, but showing a portion of the operation of the cogeneration system according to the second embodiment.
Figure 6:
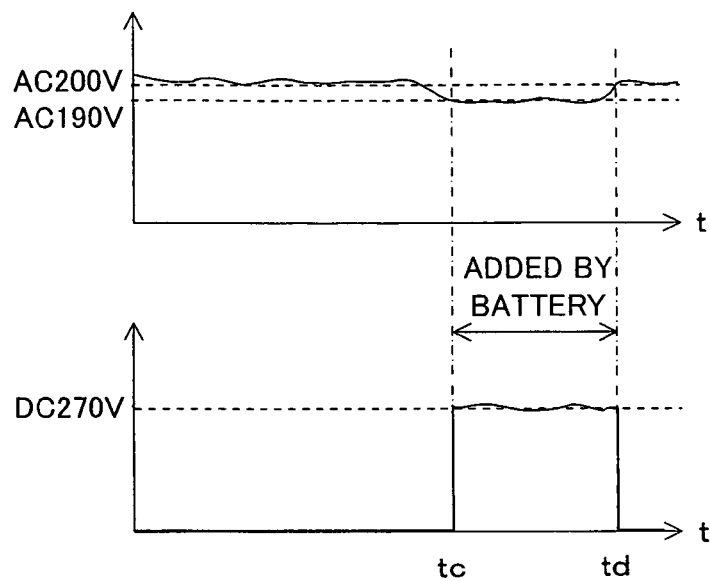
FIG. 6 is a time chart, similar to the time chart of FIG. 4, but showing the output voltages of the generator and the DC/DC converter unit of the second embodiment.

FIG. 5 is a flowchart, similar to part of the flowchart of FIG. 2, but showing a portion of the operation of the cogeneration system according to the second embodiment. FIG. 6 is a time chart, similar to the time chart of FIG. 4, but showing the output voltages of the generator 32 (more exactly, the inverter circuit 34*c*) and the DC/DC converter unit 64.

In the second embodiment, the program proceeds from S10 to S22 in the same manner as the first embodiment and to S23*a*, in which the output voltage of the voltage sensor 70, namely the output voltage Vi of the inverter circuit 34*c*, is read (detected). Next, in S24*a*, it is determined whether the detected output voltage Vi is less than a first predetermined value. The first predetermined value is set at, for instance, AC 190 V, for indicating that the operating load of the electrical load 14 has increased to the point of an overload, thus necessitating supply of supplemental power to the power plant 20 from the battery 60.

When the result in S24*a* is YES, i.e., when the power plant 20 is determined to require supply of supplemental power from the battery 60 (time point tc in FIG. 6), the program proceeds to S25*a*, in which the third switch 64*d* of the DC/DC converter unit 64 is turned ON. As a result, the output of the battery 60, whose voltage has been boosted to DC 270 V by the first DC/DC converter 64*a*, is supplied to the booster circuit 34*b* (i.e., the input side of the inverter circuit 34*c*) through the third switch 64*d* and selector switch 66.

Thus, the battery 60 is connected to the inverter circuit 34*c* of the generator 32 when the detected output voltage Vi of the inverter circuit 34*c* is less than the first predetermined value. When the result in S24*a* is NO, S25*a* is skipped.

Next, in S25*b*, it is determined whether the output voltage Vi of the inverter circuit 34*c* is greater than a second predetermined value. Specifically, it is determined whether the output voltage of the generator 32, i.e, the output voltage Vi of the inverter circuit 34*c*, has gradually risen owing to elimination of the aforesaid overload condition by the supply of supplemental power from the battery 60 in S25*a* and thus come to exceed a value (the second predetermined value) indicating that supply of supplemental power from the battery 60 is no longer necessary. The second predetermined value is therefore set to a greater value (e.g., AC 200 V) than the first predetermined value.

When the result in S25*b* is YES, i.e., when it is determined that the generator 32 no longer requires supply of supplemental power from the battery 60 (time point td in FIG. 6), the program proceeds to S25*c*, in which the third switch 64*d* of the DC/DC converter unit 64 is turned OFF. As a result, supply of power from the battery 60 to the inverter 34 is cut off (supply of supplemental power from the battery 60 is terminated).

Next, in S26*a*, it is determined whether the power network 12 is restored (the power outage has ended). When the result in S26*a* is NO, the program returns to S23*a* to repeat the foregoing processing. When it is YES, the program proceeds to S28, in which the third switch 64*d* of the DC/DC converter unit 64 is turned OFF. This completely cuts off the supply of power from the battery 60 to the inverter 34.

Thus the cogeneration system 10 according to the second embodiment is configured to detect the output voltage Vi of the inverter circuit 34*c* and connect the battery 60 to the inverter circuit 34*c* when the detected voltage is less than the first predetermined value. Owing to this configuration, the battery 60 outputs power to the inverter 34 only when the output voltage of the inverter circuit 34*c* is decreased by an increase in the operating load of the electrical load 14, thereby reducing consumption of the power of the battery 60. The remaining aspects of the second embodiment configuration are the same as those of the first embodiment.

A cogeneration system 10 according to a third embodiment of this invention will now be explained.

Figure 7:
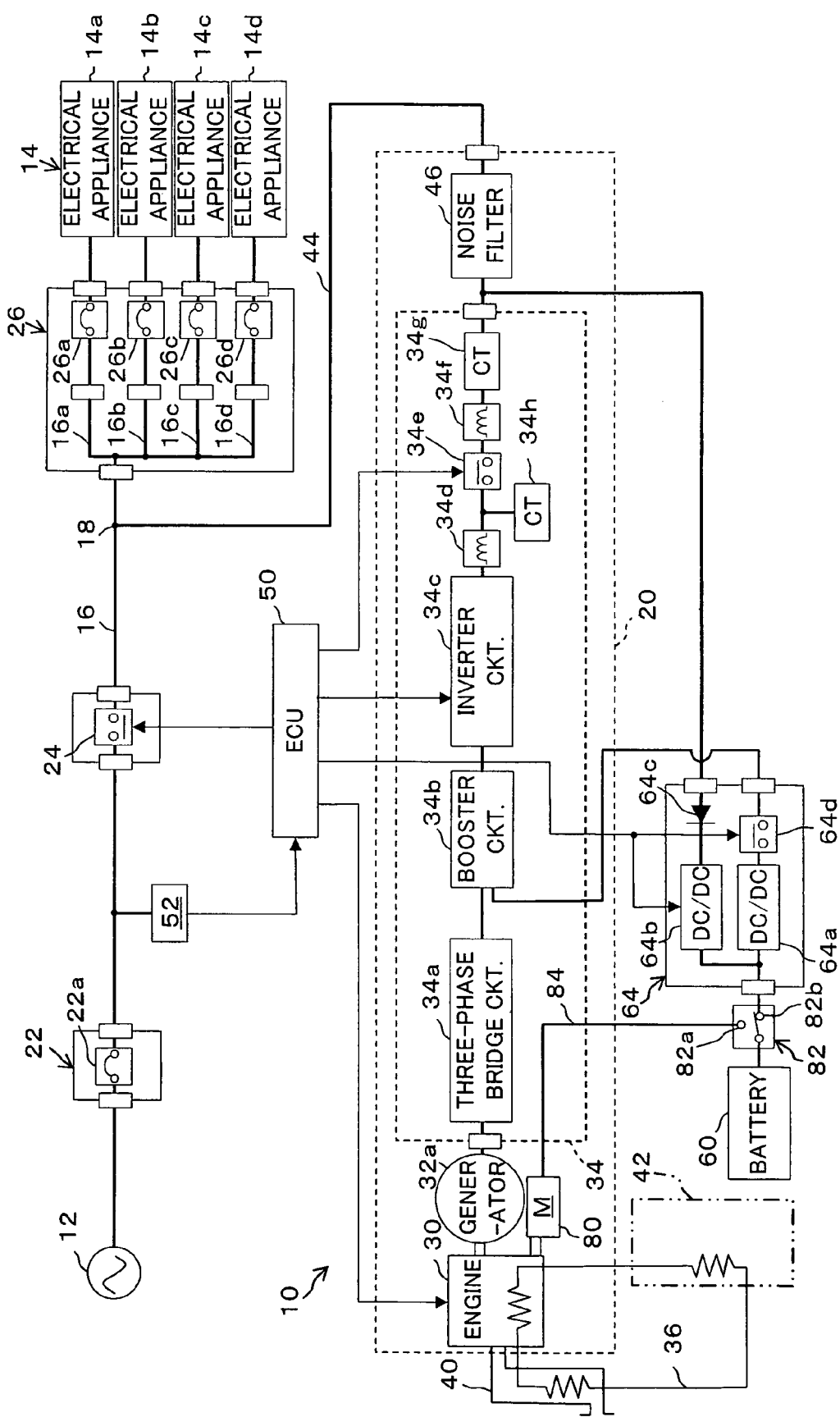
FIG. 7 is a block diagram, similar to FIG. 1, but showing the overall configuration of the cogeneration system according to the third embodiment.

FIG. 7 is a block diagram, similar to FIG. 1, but showing the overall configuration of the cogeneration system according to the third embodiment.

The third embodiment will be explained with focus on points of difference from the first embodiment in the following.

As shown in FIG. 7, the cogeneration system 10 according to the third embodiment is equipped with a starter motor 80 that serves as the starter unit of the engine 30 and with a generator 32*a* that functions solely as a generator (alternator) for outputting AC power.

In addition, the selector switch 66 is omitted, but another selector switch 82 is provided. The selector switch 82 is configured to be switched between a first terminal 82*a* connected to the starter motor 80 through a power line 84 and a second terminal 82*b* connected to the DC/DC converter unit 64.

Therefore, when the engine 30 is started to operate the power plant 20, such as in S20 of the flowchart of FIG. 2, the selector switch 82 is switched to the first terminal 82*a* and DC power output from the battery 60 is supplied to the starter motor 80 through the power line 84 to operate the starter motor 80 and crank the engine 30.

Thus the cogeneration system 10 according to the third embodiment is configured such that, instead of the generator (starter-generator) 32 of the first and second embodiments, the starter unit of the engine 30 comprises the starter motor 80. Owing to this configuration, the engine 30 can be still more reliably started by utilization of the battery 60. The remaining aspects of the third embodiment configuration are the same as those of the earlier embodiments.

A cogeneration system 10 according to a fourth embodiment of this invention will now be explained.

Figure 8:
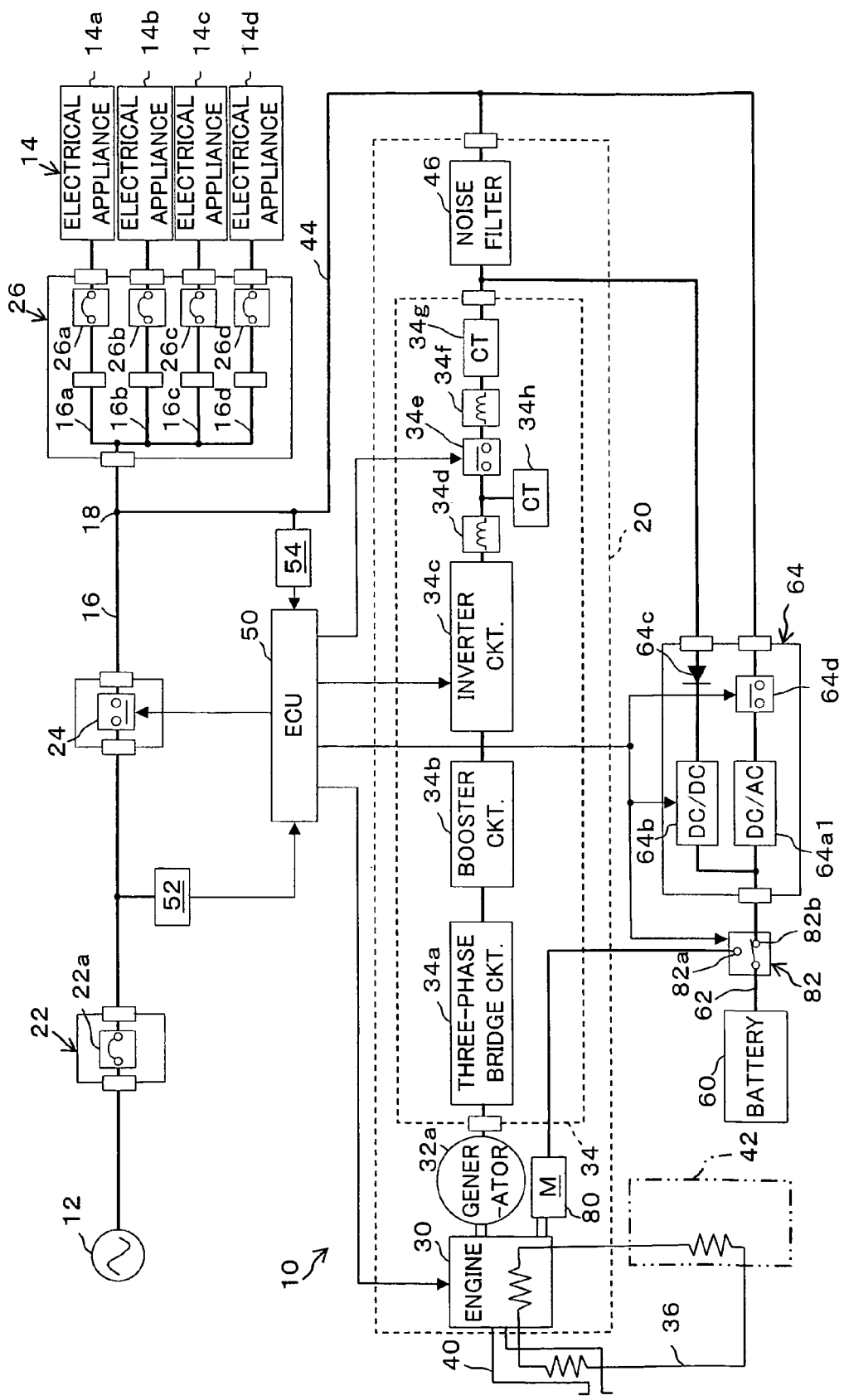
FIG. 8 is a block diagram, similar to FIG. 7 but showing the overall configuration of the cogeneration system according to the fourth embodiment.

FIG. 8 is a block diagram, similar to FIG. 7, but showing the overall configuration of the cogeneration system according to the fourth embodiment.

Since the fourth embodiment is similar to the third embodiment, it will be explained with focus on points of difference from the third embodiment in the following.

As shown in FIG. 8, in the cogeneration system 10 according to the fourth embodiment, the DC/DC converter unit 64 is equipped with a DC/AC inverter 64*a*1 that utilizes the switching action of IGBTs (not shown) to invert, while boosting, the output of the battery 60 to AC, i.e., to invert it to single-phase, three-wire, 100/200 V AC power of the same frequency as those of the power supplied by the commercial power network 12.

The DC/AC inverter 64*a*1 is connected to the second feed line 44 through the third switch 64*d*. A second current-voltage sensor 54 connected to the second feed line 44 produces outputs or signals representing the voltage, current and phase of the AC power on the second feed line 44, and send them to the ECU 50.

The selector switch 82 is switched to the first terminal 82*a* only when the engine 30 is to be started. Except for that, the selector switch 82 is switched to the second terminal 82*b* to supply the output of the DC/AC inverter 64*a*1 to the second feed line 44, when the third switch 64*d* is made ON. The ECU 50 controls the operation of the DC/AC inverter 64*a*1 to output AC power of the same phase as that of the second feed line 44 detected by the second current-voltage sensor 54.

Thus, the DC/AC inverter 64a1 is also connected to the first feed line 16, through the second feed line 44. In other words, the DC/AC inverter 64a1 is connected to the first feed line in parallel with the power plant 20, and supplies AC power to the electrical load 14 through the first and second feed lines 16, 44.

FIG. 9 is a flowchart, similar to part of the flowchart of FIG. 2, but showing a portion of the operation of the cogeneration system according to the fourth embodiment.

In the fourth embodiment, the program proceeds from S10 to S22 in the same manner as the first embodiment and to S16b, in which the first switch 24 is turned OFF to cut off or interrupt power supply from the power plant 20 to the power network 12, thereby preventing reverse power flow. At the same time, the second switch 34e is turned OFF to once cut off power supply from the power plant 20 to the electrical load 14.

Next, in S18b, the third switch 64d is turned ON. With this, the output of the DC/AC inverter 64a1, i.e., the output of the battery 60 boosted and inverted to AC power) is supplied to the electrical load 14 through the second feed line 44, connection 18 and the first feed line 16. Thus, during an outage of the power network 12, the supply of power from the power plant 20 to the power network 12 is cut off or interrupted and AC power is supplied from the DC/AC inverter 64a1 to the electrical load 14.

Next in S20b, the phase of the output of the DC/AC inverter 64a1 is detected from the output of the second current-voltage sensor 54, and in S22b, the power plant 20 is operated to output AC power of the same phase as that of the output of the DC/AC inverter 64a1, i.e., the power plant 20 is operated in synchronism with the DC/AC inverter 64a1, as is illustrated in FIG. 10. Next in S24b, the second switch 34e is turned OFF.

The remaining steps of FIG. 9 as well as the remaining elements of FIG. 8 are the same as the foregoing embodiments.

The cogeneration system 10 according to the fourth embodiment is thus equipped with the generator 32a connected to the first AC power feed line 16 between the power network 12 and the electrical load 14 and with the first switch 24 installed in the first feed line 16 and is configured to respond to detection of an outage of the power network 12 by turning OFF the first switch 24 to cut off or interrupt power supply from the generator 32a to the power network 12. Owing to this configuration, reverse flow of the power from the cogeneration system 10 into the power network 12 during an outage of the power network 12 can be reliably prevented.

Moreover, the cogeneration system 10 comprises the battery 60 for storing DC power and is configured so that after it cuts off or interrupt the supply of power from the generator 32a to the power network 12, it connects the battery 60 with the DC/AC inverter circuit 64a1 so as to invert the output of the battery 60 into AC power for supply to the electrical load 14.

Owing to this configuration, the power to be supplied to the electrical load 14 can be increased by the amount of the power output from the battery 60. Therefore, even when the electrical load comes to exceed the inherent maximum output of the cogeneration system 10, the electrical load 14 can still be supplied with the required power so long as the amount of load in excess is within the power output range of the battery 60.

In addition, when the load does not exceed the inherent maximum output of the cogeneration system 10, power can be stably supplied to the electrical load 14 even in a case where a momentary or instantaneous overload arises owing to inrush current.

Further, the cogeneration system 10 is configured to connect the battery 60 to the starter unit (starter motor 80) of the engine 30 when the generator 32a is put in operation at the time of a power outage. The engine 30 can therefore be reliably started by the battery 60.

The first to fourth embodiments are configured to have a cogeneration system (10) having a power plant (20) that includes a generator (32, 32a) connected to an AC power feed line (16) between a power network (12) and an electrical load (14) and an internal combustion engine (30) for driving the generator such that exhaust heat of the engine is supplied to a thermal load (42), comprising: a battery (60) for storing DC power; an inverter (inverter circuit 34c, DC/AC inverter 64a1) that inverts DC power to AC power; a switch (first switch 24) installed in the feed line (16); a power supply interrupter (ECU 50, S10, S16, S16b) that interrupts power supply from the generator (32) to the power network (12) by turning off the switch (24), when an outage of the power network (12) is detected; and a battery connector (ECU 50, S16 to S24, S25a, S16b to S24b) that connects the battery to the inverter (34c, 64a1), such that inverted AC power of the battery and the output of the generator are supplied to the electrical load when the power supply from the generator (32, 32a) to the power network (12) is interrupted.

In the system, the inverter circuit is an inverter circuit (34c) of the generator (32, 32a) that inverts converted and boosted output of the generator to AC power.

The system further includes: a voltage detector (voltage sensor 70) that detects output voltage of the inverter circuit (34c); and the battery connector connects the battery (60) to the inverter circuit when the detected output voltage of the inverter circuit is less than a (first) predetermined value (S25a).

In the system, the battery connector connects the battery (60) to a starter unit of the engine (30), when the generator is to be started (S20).

In the system, the starter unit comprises at least one of the generator (32, 32a) and a starter motor (80).

In the system, the generator (32, 32a) is supplied with AC power from the power network (12) when the engine (30) is to be started.

In the system, the starter motor (80) is supplied with the DC power from the battery (60) when the engine is to be started.

In the system, the inverter is an inverter circuit (DC/AC inverter 64a1) connected to the AC power feed line (16) in parallel with the generator (32a) for inverting the DC power of the battery (60).

The system further includes: a phase detector (second current-voltage sensor 54) that detects phase of output of the inverter circuit (DC/AC inverter 64a1); and a generator operator (ECU 50, S16b to S24b) that operates the generator (32a) to output the AC power in same phase as the detected phase of the output of the inverter circuit, such that the inverted AC power of the battery (60) and the AC power of the generator (32a) in the same phase are supplied to the electrical load (14).

In the system, the battery connector connects the battery (60) to a starter unit (starter motor 80) of the engine (30), when the generator (32a) is to be started (S22b).

It should be noted in the above that although the embodiments of the cogeneration system set out in the foregoing are configured to start the engine 30 and operate the power plant 20 when an outage of the power network 12 has not been detected, it is possible instead to adopt a configuration that activates operation of the power plant 20 in response to the use condition of the electrical load 14 and/or thermal load.

It should also be noted in the above that although the embodiments of the cogeneration system use the exhaust heat of the engine 30 to make hot water, it is possible instead to use it to make hot air for air conditioning.

It should still be noted that, although the embodiments of the cogeneration system set out in the foregoing are configured to detect the phase of the AC power output by the power network 12 and operate the power plant 20 to output AC power of the same phase as the detected phase, it is possible instead to adopt a configuration that operates the power plant 20 to output AC power of not only the same phase but also the same voltage.

It should yet still be noted that although the embodiments of the cogeneration system set out in the foregoing are configured to utilize an engine that runs on gasoline fuel as the prime mover (engine 30) for operating the power plant 20, it is possible instead to adopt a configuration that, for example, uses a gas engine that runs on natural gas or liquid propane gas.

It should yet still be noted that although the embodiments of the cogeneration system set out in the foregoing are explained as using AC power of 100/200 V output by the power network 12, it goes without saying that if the voltage of the AC power output by the power network exceeds 100/200 V, the power plant 20 is configured to produce an output of corresponding voltage.

It should yet still be noted that although concrete values are given for the maximum power output of the generator 32 and the displacement etc. of the engine 30, the values given are merely examples and are not to be construed as placing any limit whatsoever on the invention.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a power plant that includes a generator connected to an AC power feed line between a power network and an electrical load and an internal combustion engine for driving the generator such that exhaust heat of the engine is supplied to a thermal load, comprising:
    a battery for storing DC power;
    an inverter that inverts DC power to AC power;
    a switch installed in the feed line;
    a power supply interrupter that interrupts power supply from the generator to the power network by turning off the switch, when an outage of the power network is detected;
    a battery connector that connects the battery to the inverter, such that inverted AC power of the battery and the output of the generator are supplied to the electrical load when the power supply from the generator to the power network is interrupted;
    a DC/DC converter connected to the battery which steps up the output of the battery to a predetermined voltage; and
    a second switch installed between the DC/DC converter and the inverter such that an output of the DC/DC converter is supplied to said second switch, wherein said second switch is normally turned off;
    wherein the inverter is an inverter circuit of the generator that inverts converted and boosted output of the generator to AC power.

2. The system according to claim 1, further including:
    a voltage detector that detects output voltage of the inverter circuit; and
    the battery connector connects the battery to the inverter circuit when the detected output voltage of the inverter circuit is less than a predetermined value.

3. The system according to claim according to claim 1, wherein the battery connector connects the battery to a starter unit of the engine, when the generator is to be started.

4. The system according to claim 3, wherein the starter unit comprises at least one of the generator and a starter motor.

5. The system according to claim 4, wherein the generator is supplied with AC power from the power network when the engine is to be started.

6. The system according to claim 4, wherein the starter motor is supplied with the DC power from the battery when the engine is to be started.

7. A cogeneration system having a power plant that includes a generator connected to an AC power feed line between a power network and an electrical load and an internal combustion engine for driving the generator such that exhaust heat of the engine is supplied to a thermal load, comprising:
    a battery for storing DC power;
    an inverter that inverts DC power to AC power;
    a switch installed in the feed line;
    a power supply interrupter that interrupts power supply from the generator to the power network by turning off the switch, when an outage of the power network is detected;
    a battery connector that connects the battery to the inverter, such that inverted AC power of the battery and the output of the generator are supplied to the electrical load when the power supply from the generator to the power network is interrupted;
    a phase detector that detects phase of output of the inverter circuit; and
    a generator operator that operates the generator to output the AC power in same phase as the detected phase of the output of the inverter circuit, such that the inverted AC power of the battery and the AC power of the generator in the same phase are supplied to the electrical load; wherein the inverter is an inverter circuit connected to the AC power feed line in parallel with the generator for inverting the DC power of the battery.

8. The system according to claim 7, wherein the battery connector connects the battery to a starter unit of the engine, when the generator is to be started.

9. A cogeneration system having a power plant that includes a generator connected to an AC power feed line between a power network and an electrical load and an internal combustion engine for driving the generator such that exhaust heat of the engine is supplied to a thermal load, comprising:
    a battery for storing DC power;
    an inverter that inverts DC power to AC power;
    a switch installed in the feed line;
    a power supply interrupter that interrupts power supply from the generator to the power network by turning off the switch, when an outage of the power network is detected;
    a battery connector that connects the battery to the inverter, such that inverted AC power of the battery and the output of the generator are supplied to the electrical load when the power supply from the generator to the power network is interrupted;

a DC/DC converter connected to the battery which steps up the output of the battery to a predetermined voltage;

a second switch installed between the DC/DC converter and the inverter such that an output of the DC/DC converter is supplied to said second switch, wherein said second switch is normally turned off; and a selector switch connected to the output of said second switch for selectively supplying power from said DC/DC converter to said inverter circuit or to a drive circuit, wherein the inverter is an inverter circuit of the generator that inverts converted and boosted output of the generator to AC power.

10. The system according to claim 9, further including:

a voltage detector that detects output voltage of the inverter circuit;

wherein the second switch is turned on and the selector switch connects the battery to the inverter circuit when the detected output voltage of the inverter circuit is less than a first predetermined value and when the detected output voltage of the inverter circuit is greater than a second predetermined value the second switch is turned off.

11. The system according to claim 10, wherein said first predetermined value is less than said second predetermined value.

12. The system according to claim 9, wherein the output of the DC/DC converter is set to be lower than an output of said generator by a predetermined value.

13. The system according to claim 1, wherein the power network is disconnected from the electrical load while the generator output of the generator remains connected to the electrical load after the switch is turned off by the power supply interrupter.

* * * * *

UNITED STATES PATENT AND TRADEMARK OFFICE
CERTIFICATE OF CORRECTION

| | |
|---|---|
| PATENT NO. | : 7,847,434 B2 |
| APPLICATION NO. | : 12/069746 |
| DATED | : December 7, 2010 |
| INVENTOR(S) | : Wakitani et al. |

It is certified that error appears in the above-identified patent and that said Letters Patent is hereby corrected as shown below:

Column 14:
　　Line 7, change "according to claim according to claim" to --according to claim--.

Column 16:
　　Line 2, change "value and when" to --value, and when--.

Signed and Sealed this
Fifteenth Day of March, 2011

David J. Kappos
*Director of the United States Patent and Trademark Office*